(12) United States Patent
Malina et al.

(10) Patent No.: US 7,740,294 B2
(45) Date of Patent: Jun. 22, 2010

(54) PROTECTIVE VEHICLE COVER

(76) Inventors: Ronny Malina, 119 Rockland Center, #149, Nanuet, NY (US) 10954; Eric Malina, 119 Rockland Center, #149, Nanuet, NY (US) 10954

( * ) Notice: Subject to any disclaimer, the term of this patent is extended or adjusted under 35 U.S.C. 154(b) by 694 days.

(21) Appl. No.: 11/601,182

(22) Filed: Nov. 16, 2006

(65) Prior Publication Data
US 2008/0116703 A1 May 22, 2008

(51) Int. Cl.
*B60R 19/44* (2006.01)
(52) U.S. Cl. .................... 293/142; 293/128
(58) Field of Classification Search ........... 296/136.08, 296/136.02; 280/770; 293/142, 117, 128
See application file for complete search history.

(56) References Cited

U.S. PATENT DOCUMENTS

| | | | |
|---|---|---|---|
| 2,758,866 A | | 8/1956 | Dollar |
| 3,367,702 A * | | 2/1968 | Sauer .................... 293/128 |
| 3,610,669 A | | 10/1971 | Morrissey |
| 3,902,752 A * | | 9/1975 | Pelletier ................. 280/727 |
| 4,002,363 A * | | 1/1977 | James .................... 293/128 |
| 4,376,546 A | | 3/1983 | Guccione et al. |
| 4,401,331 A * | | 8/1983 | Ziner et al. ............. 293/128 |
| 4,493,502 A | | 1/1985 | Campbell, Jr. |
| 4,561,685 A | | 12/1985 | Fischer |
| 4,708,380 A * | | 11/1987 | Cruz ..................... 293/128 |
| 4,997,229 A | | 3/1991 | Swanson |
| 5,056,817 A | | 10/1991 | Fuller |
| 5,129,678 A | | 7/1992 | Gurbacki |
| 5,149,166 A * | | 9/1992 | Wille et al. ............. 293/128 |
| 5,184,857 A * | | 2/1993 | Hawkins ................ 293/128 |
| 5,618,073 A | | 4/1997 | Criscione |
| 5,975,599 A * | | 11/1999 | Goldstein .............. 293/128 |
| D437,810 S | | 2/2001 | Runfola |
| 6,572,086 B2 | | 6/2003 | Kelly |
| 6,572,163 B1 | | 6/2003 | Pickett |
| 6,637,790 B2 | | 10/2003 | Bio |
| D508,222 S * | | 8/2005 | Tekavec ................ D12/167 |
| 7,073,830 B1 | | 7/2006 | Chen |
| 2002/0024224 A1* | | 2/2002 | Bio ...................... 293/142 |
| 2003/0214138 A1 | | 11/2003 | Schmid |

* cited by examiner

*Primary Examiner*—Kiran B. Patel
(74) *Attorney, Agent, or Firm*—Jeffrey Sonnabend; SonnabendLaw

(57) ABSTRACT

A vehicle protector having an elongated body with a front surface, a back surface, a top, a bottom, and a first and second end, the first and second ends disposed opposite from one another, with first and second top straps disposed on the front surface nearer to the top than the bottom, the first top strap having a distal end extending from the first body end and the second top strap having a distal end extending from the second body end. Upon the application of tensile forces to the first and second top straps and the first and second bottom straps, the top of the body is drawn towards the bottom of the body on the back surface.

20 Claims, 5 Drawing Sheets

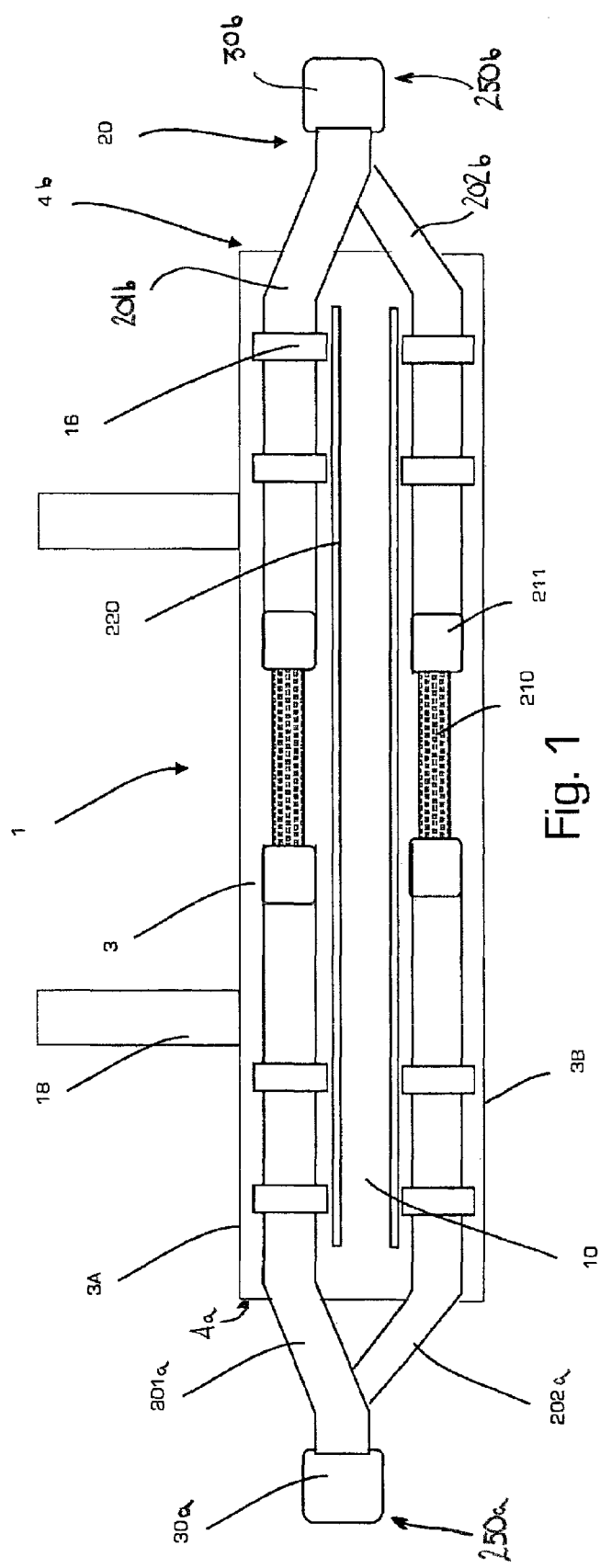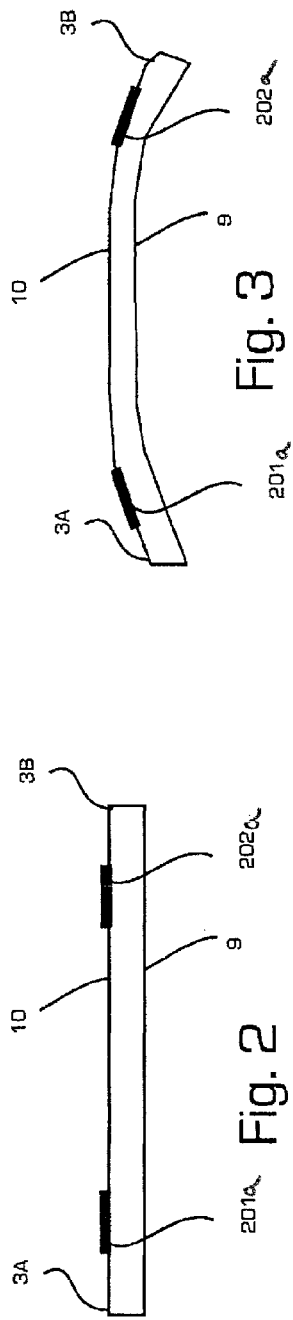

PROTECTIVE VEHICLE COVER

BACKGROUND OF THE INVENTION

1. Field of the Invention

The present invention relates generally to the field of vehicular protection and specifically to the field of automotive body protection.

2. Background of the Related Art

Vehicles, such as cars, trucks, vans and the like (collectively "automobiles" or "vehicles"), may come into contact with other objects during operation of the vehicle or while the vehicle is parked on streets or in parking structures such as public parking garages. This type of contact may result in damage to the finish of the automobile such as scratches and transferred paint, and may include structural damage to the automobile such as denting or cracking.

In the past, several attempts have been made to protect automobile exteriors from precisely this type of damage without marring the overall appearance or operation of the vehicle. For example, U.S. Pat. No. 6,637,790 discloses a "Deformable Vehicle Bumper Guard" comprised essentially of a block of cushioning material which is placed in front an automobile's bumper. This device does not protect the entire bumper, nor may it be readily attached to other portions of an automobile to protect them. Additionally, because the device is secured to the vehicle above the bumper it is designed to protect but is not constrained in any other direction, the device may be readily displaced during impact, thereby eliminating its protective value partially or completely.

Another example of an inadequate attempt to solve the above identified problems is disclosed in U.S. Pat. No. 6,572,086 for an "External Cushion Protector for Bumper of a Parked Vehicle." This patent discloses a cushioning device which is supported from above by clamping support structures between a rear lip of a trunk door and an automobile body. Additionally, the device is supported by magnets to the exterior of the automobile body. This device embodies several disadvantages, namely: (1) support via a trunk lid limits the use of the product to automobiles with trunks, thus excluding sport utility vehicles ("SUV's"), pickup trucks, station wagons and the like; (2) magnetic supports will not function on many of today's vehicles having composite, non-ferromagnetic bodies, thus rendering the device unusable; and (3) magnetic supports may scratch the automobile bodies as the device is applied and removed, thereby causing the very damage the device seeks to protect.

Still another example of an inadequate attempt to solve the problem is disclosed in U.S. Pat. No. 5,618,073, entitled "Automobile Rear Bumper Protector". This patent discloses a device consisting of two "attachment handles" which are fixedly attached to the automobile and by means of which a panel is supported to cover the automobile's rear bumper. This device has the serious drawback of requiring the "attachment handles" to be installed via sheet metal screws or the like. Such attachment not only requires significant labor and equipment, but also may lead to corrosion at the points of installation. Furthermore, because the panel is supported only at its longitudinal ends, significant slippage may occur in the center of the panel, thereby exposing significant portions of the bumper to potential damage.

Yet another type of proposed solution requires the fabrication of a protective cover specifically designed to fit the contours of a particular automobile model. These devices, often referred to as "bras", rely on the close correlation of cover shape and automobile shape, as well as the use of clips located on the device to attach to the automobile at points specific to the automobile model to secure the device to the vehicle. Examples of this type of device may be found in U.S. Pat. Nos. 5,056,817 and 4,997,229. These devices have the disadvantage of being specifically designed for particular automobile models, thus requiring manufacturers to manufacture and maintain inventory of large numbers of different designs.

With these considerations in mind, it is desirable to have a single device for protecting a wide range of automobile models that securely protects automobile exteriors without the need for labor intensive installation procedures.

SUMMARY OF THE INVENTION

The subject invention is directed to a new and useful vehicle protector and more particularly to an automotive body protector.

A preferred embodiment of the present invention consists of a vehicle protector having an elongated body with a front surface, a back surface, a top, a bottom, and a first and second end. In this embodiment, the first and second ends disposed opposite from one another. This embodiment further includes first and second top straps disposed on the front surface nearer to the top than the bottom, the first top strap having a distal end extending from the first body end and the second top strap having a distal end extending from the second body end. First and second bottom straps are disposed on the front surface nearer to the bottom than the top. The first bottom strap has a distal end extending from the first body end and the second bottom strap has a distal end extending from the second body end. A first vehicle attachment portion adapted to secure the vehicle protector to a vehicle is operatively connected to the distal end of the first top strap and the distal end of the first bottom strap and a second vehicle attachment portion adapted to secure the vehicle protector to a vehicle is operatively connected to the distal end of the second top strap and the distal end of the second bottom strap. Alternatively, the bottom straps may be operatively connected to the top straps adjacent to the distal ends of the top straps and adjacent to the vehicle attachment portions.

In these embodiments, the vehicle protector may include a first strap securing element disposed on the front surface and a second strap securing element disposed on one of the straps, wherein the first and second strap securing elements cooperate to secure the one of the straps to the front surface. Furthermore, upon the application of tensile forces to the first and second top straps and the first and second bottom straps, the top of the body may be drawn towards the bottom of the body on the back surface. The top straps and the bottom straps may be disposed substantially parallel to the top and bottom of the body.

The vehicle protector may further include a front surface channel disposed in the front surface, the front surface channel being disposed between the top straps and the bottom straps.

The various aspects of the preceding embodiments may be combined to realize other embodiments of the present invention.

These and other aspects of the subject invention will become more readily apparent to those having ordinary skill in the art from the following detailed description of the invention taken in conjunction with the drawings described herein.

BRIEF DESCRIPTION OF THE DRAWINGS

So that those having ordinary skill in the art to which the subject invention pertains will more readily understand how to make and use the subject invention, preferred embodiments thereof will be described in detail herein with reference to the drawings.

FIG. 1 is a plan view of a second preferred embodiment of the present invention.

FIGS. 2 and 3 are elevational cross sections of the preferred embodiment of the present invention depicted in FIG. 1.

DETAILED DESCRIPTION OF THE PREFERRED EMBODIMENTS

Figure 5:
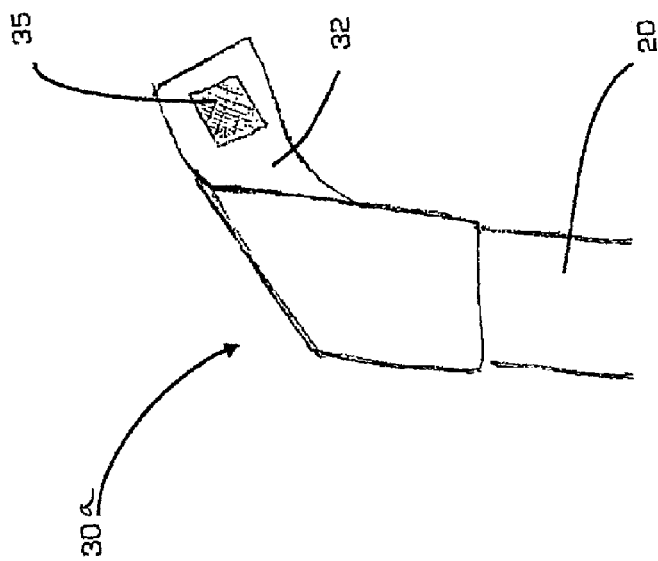
FIGS. 4 and 5 are perspective views showing a detailed portion of a preferred embodiment of the instant invention.

Referring now in detail to the drawings there is illustrated in FIG. 1 a plan view of a preferred embodiment of the present invention. Protective cover 1 includes an elongated body portion 3, having energy absorbing padding therein (not shown), a top 3A and a bottom 3B and opposing front 10 and back 9 surfaces and opposing first and second ends 4. Strap assembly 20 includes first and second top straps 201*a* and 201*b* and bottom straps 202*a* and 202*b* each of which passes through retainers 16. Front surface 10 includes two front surface channels 220 created therein. These front surface channels may be created through stitching or other means which creates a recessed channel in front surface 10.

Each top strap 201*a* and 201*b* and bottom strap 202*a* and 202*b* are secured to front surface 10, and thereby to body portion 3, by means of cooperating strap securing elements 210 and 211. While FIG. 1 depicts strap securing elements 210 and 211 as being complimentary hook-and-loop fabric portions, and means which releasably and securely affixes the straps to the body portion may be used, including among others, clips or buckles, buttons, snaps and the like. The effective length of strap assembly 20 may be adjusted by changing the point at which each strap is affixed to front surface 10, for instance, by repositioning strap securing element 211 at different points along the length of strap securing element 210.

Straps 201*a* and 201*b*, and 202*a* and 202*b* may be of partially elastic material such that upon securing the 10 protective cover to a vehicle by means of vehicle attachment portions 30*a* and 30*b*, straps 201*a* and 201*b* and 202*a* and 202*b* are maintained in tension, thereby holding protective cover 1 in place. Additionally, upon securing the protective cover to a vehicle as described, the forces transmitted along the length of straps 201*a*, 201*b* and 202*a* and 202*b* cause the protective cover to curl, thereby conforming to the vehicle bumper to which it is attached. FIG. 2 depicts a cross section of the protective cover in an unattached, curled state. FIG. 3 depicts the same cross section of the protective cover in an attached, curled state. The curling may occur in conjunction with front surface channels 220, which may facilitate such curling at or about the channels.

Straps 201 and 202 may be of partially elastic material such that upon securing the protective cover to a vehicle by means of vehicle attachment portions 30, straps 201 and 202 are maintained in tension, thereby holding protective cover 1 in place. Additionally, upon securing the protective cover to a vehicle as described, the forces transmitted along the length of straps 201 and 202 cause the protective cover to curl, thereby conforming to the vehicle bumper to which it is attached. FIG. 2 depicts a cross section of the protective cover in an unattached, uncurled state. FIG. 3 depicts the same cross section of the protective cover in an attached, curled state. The curling may occur in conjunction with front surface channels 220, which may facilitate such curling at or about the channels.

The energy absorbing padding may be any foam or foam like substance which provides cushioning and absorption of impact energy. Other materials which provide cushioning and impact energy absorption may also be used. These materials may be selected based on criteria such as their cost, density/weight properties and the like.

Protective cover 1 may include security straps 18. These straps may be fixedly attached to body portion 3 by stitching, riveting, gluing or the like or any combination thereof, and may be made from any material otherwise suitable for construction of body 3. Security straps 18 may be secured by placing them across the opening of an opened automobile trunk and then closing the trunk, thereby securing the security straps 18 between the automobile body and the trunk lid such that the security straps 18 may only be freed from the trunk by opening the trunk lid, which may in turn require the use of a key. By this, theft of the protective cover may be deterred. Similarly, security straps 18 may be secured by placing them between any lockable structure and the body, for example between an automobile door and body or pickup truck rear gate and body, among others.

Figure 7:
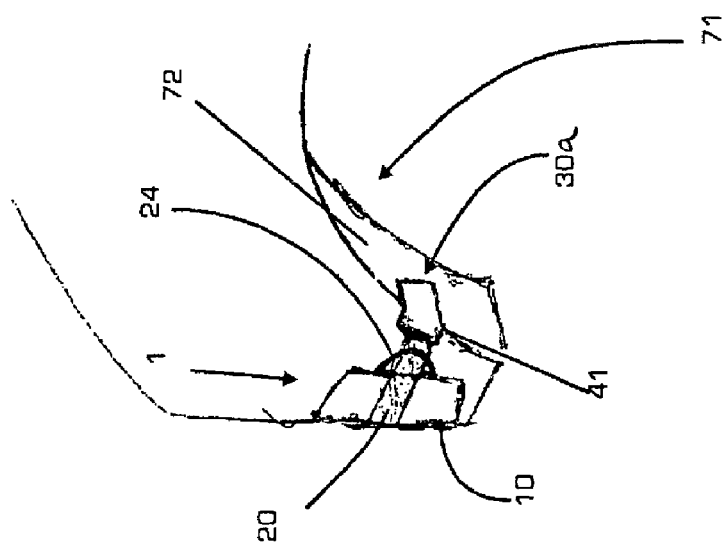
FIGS. 7 and 8 are partial perspective views of preferred embodiments of the instant invention operatively coupled to an automobile.
Figure 8:
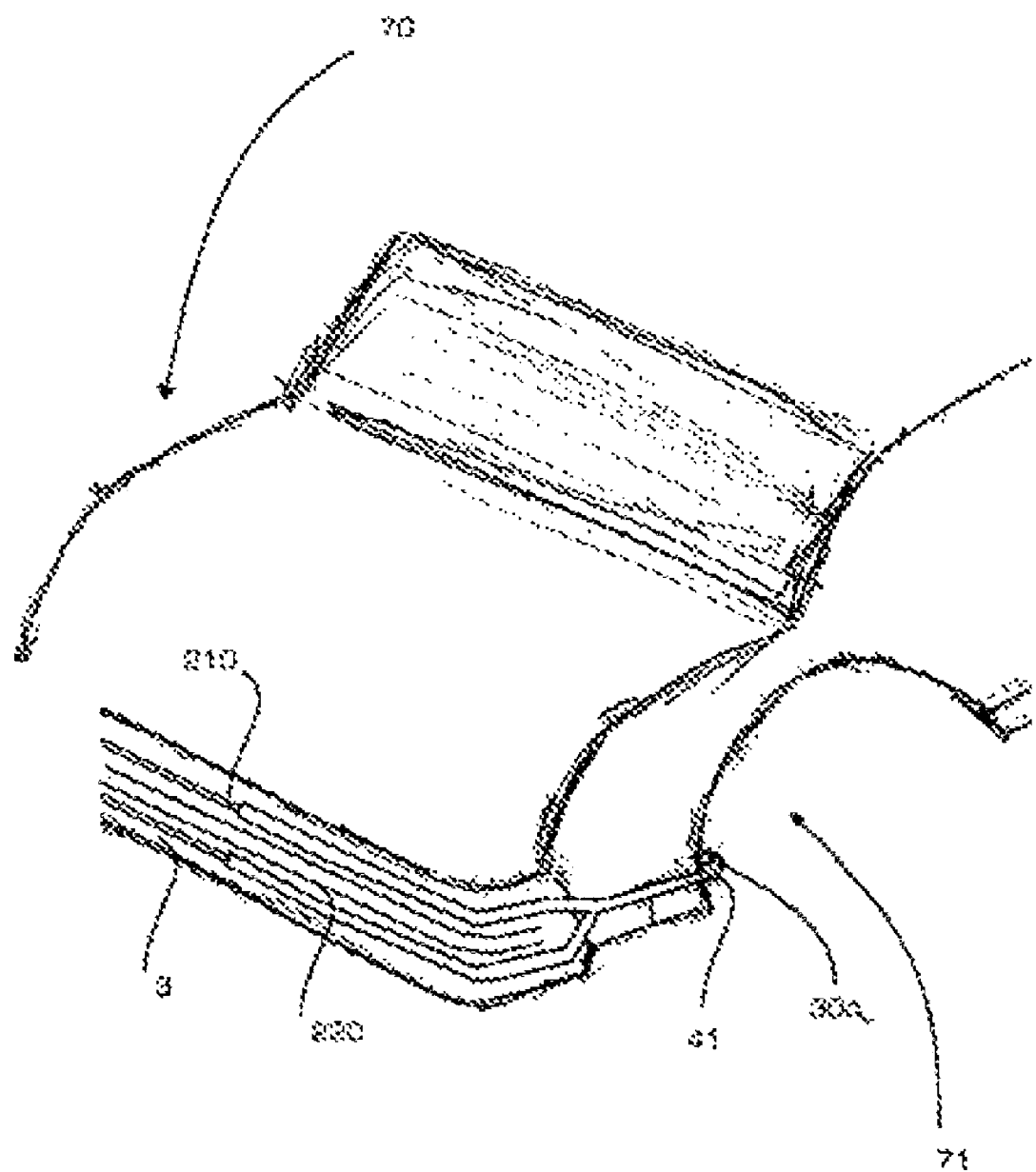

Referring now to FIGS. 7 and 8, a protective cover 1 is shown operatively attached to a vehicle 70. Body portion 3 is shown covering the rear bumper (not shown) of vehicle 70. Vehicle attachment portion 30*a* is angled at 41 to conform to wheel well 71, as will be discussed in further detail below. The front (not shown) of attachment portion 30*a* is in contact with a wall 72, of wheel well 71, permitting the tensioning of strap assembly 20. Strap assembly 20 has been adjusted, thereby maintaining the protective cover operatively over the bumper to be protected.

Figure 4:
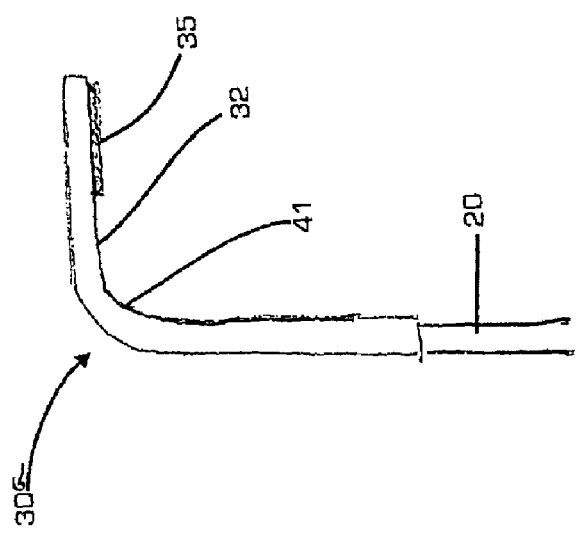
Figure 6:
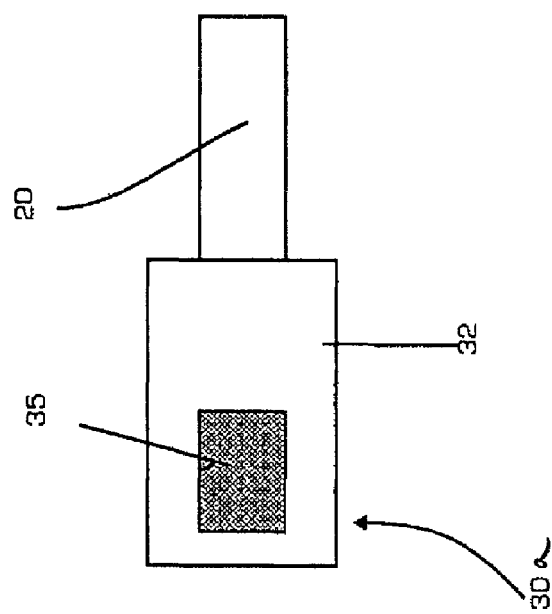
FIG. 6 is a detailed plan view of a portion of a preferred embodiment of the instant invention.
Figure 9:
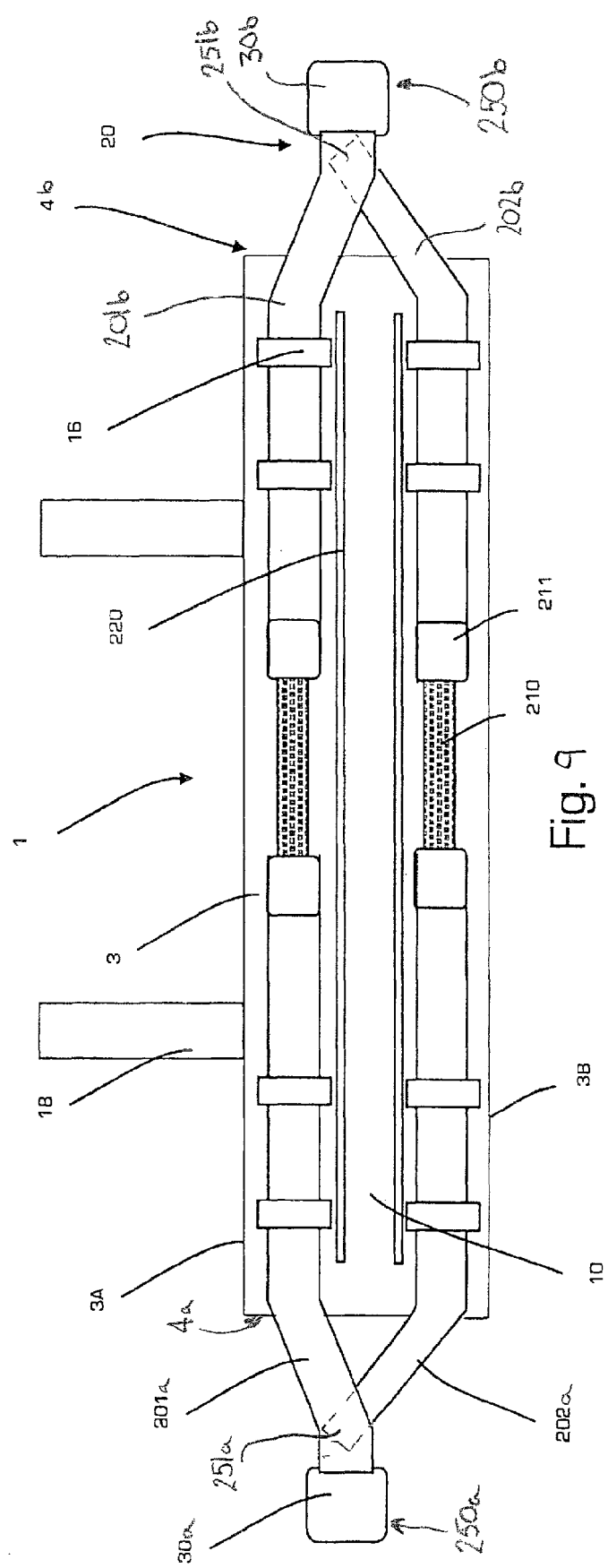
FIG. 9 is a plane view of another preferred embodiment of the present invention.

Vehicle attachment portion 30*a* incorporates a plastically deformable material so that it may be bent and/or angled so as to conform to the contours of the portion of the vehicle with which it will be associated, for example, to the contours of a vehicle's wheel well. FIG. 4 shows a side view of vehicle attachment portion 30*a* bent at 41 to conform to a vehicle. FIG. 5 shows an another view of a vehicle attachment portion 30*a* bent in a different configuration. FIG. 9 shows the distal end 250*a* of the first top strap 201*a* operatively connected to the distal end 251*a* of the first bottom strap 202*a*, and the distal end 250*b* of the second top strap 201*b* operatively connected to the distal end 251*b* of the second bottom strap 202*b*.

While particular embodiments of the present invention have been shown and described, it will be apparent to those skilled in the pertinent art that changes and modifications may be made without departing from the invention in its broader aspects.

What is claimed is:

1. A vehicle bumper protector for a vehicle comprising:

an elongated body having a front surface, a back surface, a top, a bottom, and a first and second end, said first and second ends;

first and second top straps disposed on said front surface nearer to said top than said bottom, said first top strap having a distal end extending from said first body end and said second top strap having a distal end extending from said second body end;

first and second bottom straps disposed on said front surface nearer to said bottom than said top, said first bottom strap having a distal end extending from said first body end and said second bottom strap having a distal end extending from said second body end;

a first vehicle attachment portion adapted to secure said vehicle protector to said vehicle, said vehicle attachment portion operatively connected to said distal end of said first top strap and said distal end of said first bottom strap; and a second vehicle attachment portion adapted to secure said vehicle protector to said vehicle, said vehicle attachment portion operatively connected to said distal end of said second top strap and said distal end of said second bottom strap.

2. The vehicle protector of claim 1 further comprising a first strap securing element disposed on said front surface and a second strap securing element disposed on one of said straps, wherein said first and second strap securing elements cooperate to secure said one of said straps to said front surface.

3. The vehicle protector of claim 1 wherein, upon the application of tensile forces to said first and second top straps and said first and second bottom straps, said top of said body is drawn towards said bottom of said body on said back surface.

4. The vehicle protector of claim 3 further comprising a first strap securing element disposed on said front surface and a second strap securing element disposed on one of said straps, wherein said first and second strap securing elements cooperate to secure said one of said straps to said front surface.

5. The vehicle protector of claim 1, wherein said top straps and said bottom straps are disposed substantially parallel to said top and bottom of said body.

6. The vehicle protector of claim 5 wherein, upon the application of tensile forces to said first and second top straps and said first and second bottom straps, said top of said body is drawn towards said bottom of said body on said back surface.

7. The vehicle protector of claim 6 further comprising a first strap securing element disposed on said front surface and a second strap securing element disposed on one of said straps, wherein said first and second strap securing elements cooperate to secure said one of said traps to said front surface.

8. The vehicle protector of claim 1 further comprising a front surface channel disposed in said front surface, said front surface channel being disposed between said top straps and said bottom straps.

9. The vehicle protector of claim 8 wherein, upon the application of tensile forces to said first and second top straps and said first and second bottom straps, said top of said body is drawn towards said bottom of said body on said back surface.

10. The vehicle protector of claim 9 further comprising a first strap securing element disposed on said front surface and a second strap securing element disposed on one of said straps, wherein said first and second strap securing elements cooperate to secure said one of said straps to said front surface.

11. A vehicle bumper protector for a vehicle comprising:
an elongated body having a front surface, a back surface, a top, a bottom, and a first and second end, said first and second ends;
first and second top straps disposed on said front surface nearer to said top than said bottom, said first top strap having a distal end extending from said first body end and said second top strap having a distal end extending from said second body end;
first and second bottom straps disposed on said front surface nearer to said bottom than said top, said first bottom strap having a distal end extending from said first body end and said second bottom strap having a distal end extending from said second body end;

a first vehicle attachment portion adapted to secure said vehicle protector to said vehicle, said first vehicle attachment portion operatively connected to said distal end of said first top strap, said distal end of said first bottom strap operatively connected to said first top strap adjacent to said distal end of said first top strap and adjacent to said vehicle first attachment portion; and a second vehicle attachment portion adapted to secure said vehicle protector to said vehicle, said second vehicle attachment portion operatively connected to said distal end of said second top strap, said distal end of said second bottom strap operatively connected to said second top strap adjacent to said distal end of said second top strap and adjacent to said second vehicle attachment portion.

12. The vehicle protector of claim 11 further comprising a first strap securing element disposed on said front surface and a second strap securing element disposed on one of said straps, wherein said first and second strap securing elements cooperate to secure said one of said straps to said front surface.

13. The vehicle protector of claim 11 wherein, upon the application of tensile forces to said first and second top straps and said first and second bottom straps, said top of said body is drawn towards said bottom of said body on said back surface.

14. The vehicle protector of claim 13 further comprising a first strap securing element disposed on said front surface and a second strap securing element disposed on one of said straps, wherein said first and second strap securing elements cooperate to secure said one of said straps to said front surface.

15. The vehicle protector of claim 11, wherein said top straps and said bottom straps are disposed substantially parallel to said top and bottom of said body.

16. The vehicle protector of claim 15 wherein, upon the application of tensile forces to said first and second top straps and said first and second bottom straps, said top of said body is drawn towards said bottom of said body on said back surface.

17. The vehicle protector of claim 16 further comprising a first strap securing element disposed on said front surface and a second strap securing element disposed on one of said straps, wherein said first and second strap securing elements cooperate to secure said one of said straps to said front surface.

18. The vehicle protector of claim 11 further comprising a front surface channel disposed in said front surface, said front surface channel being disposed between said top straps and said bottom straps.

19. The vehicle protector of claim 18 wherein, upon the application of tensile forces to said first and second top straps and said first and second bottom straps, said top of said body is drawn towards said bottom of said body on said back surface.

20. The vehicle protector of claim 19 further comprising a first strap securing element disposed on said front surface and a second strap securing element disposed on one of said straps, wherein said first and second strap securing elements cooperate to secure said one of said straps to said front surface.

* * * * *